(No Model.) 2 Sheets—Sheet 1.
H. A. KING.
VELOCIPEDE.
No. 349,800. Patented Sept. 28, 1886.
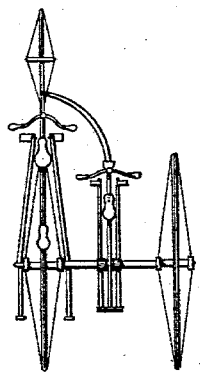
Fig. 1.
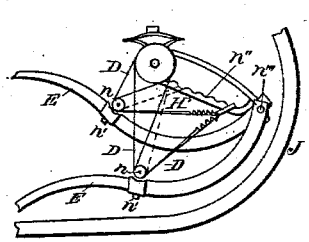
Fig. 3.
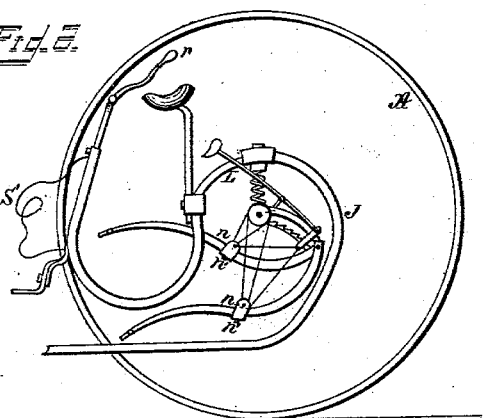
Fig. 2.
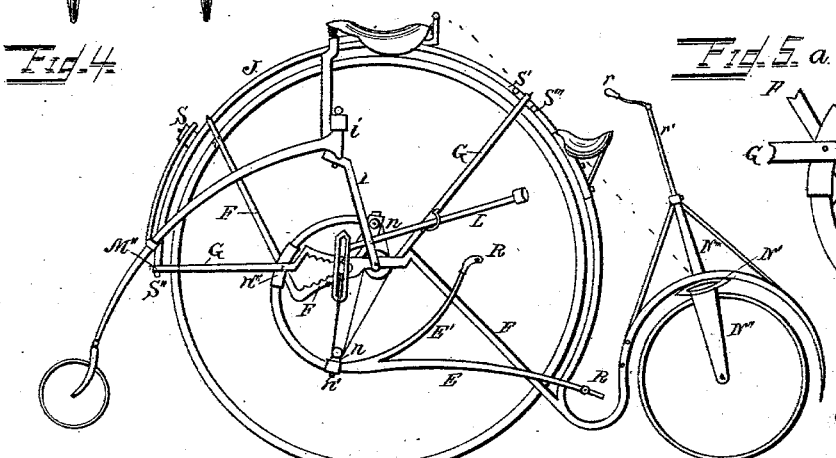
Fig. 4.
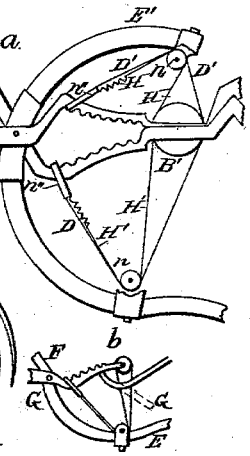
Fig. 5.
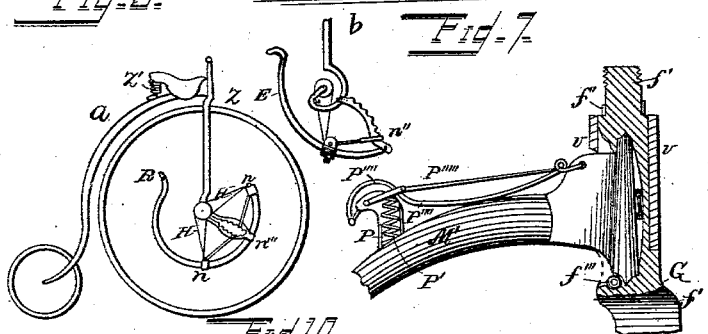
Fig. 6. Fig. 7.
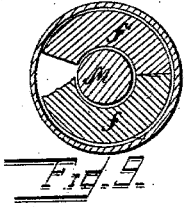
Fig. 8.
Fig. 9.
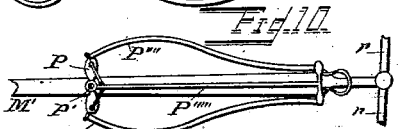
Fig. 10.
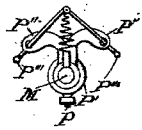
Fig. 11.
WITNESSES
F. L. Durand
A. J. King.
INVENTOR
Homer A. King.

(No Model.) 2 Sheets—Sheet 2.
H. A. KING.
VELOCIPEDE.
No. 349,800. Patented Sept. 28, 1886.
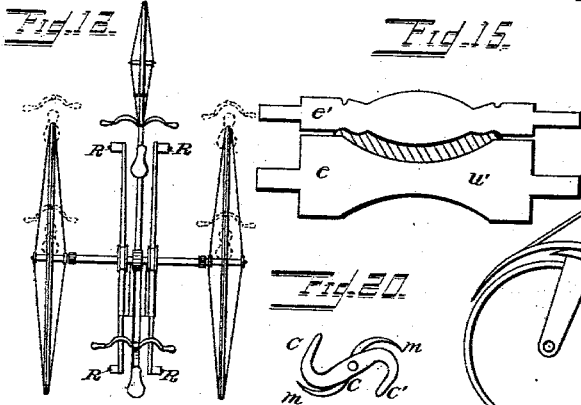
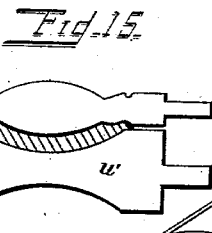
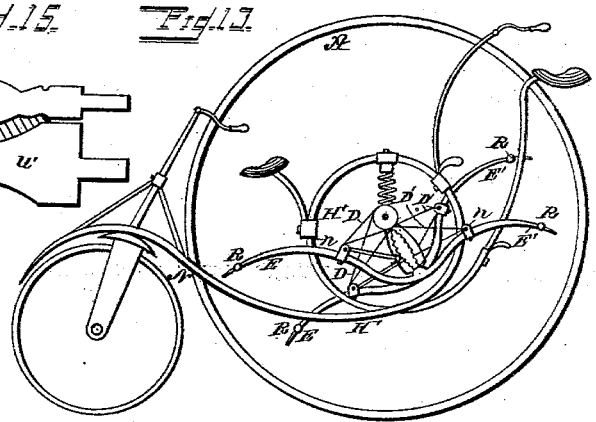
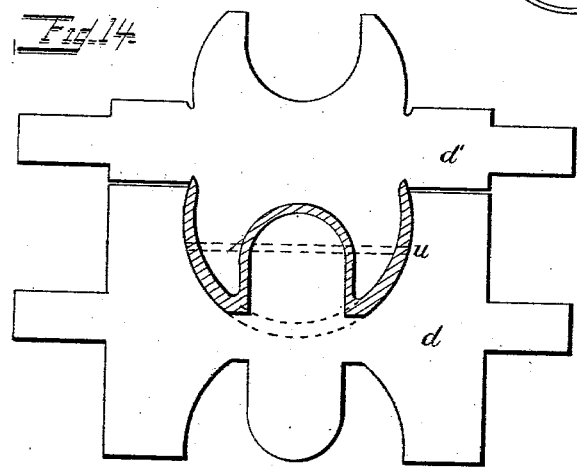
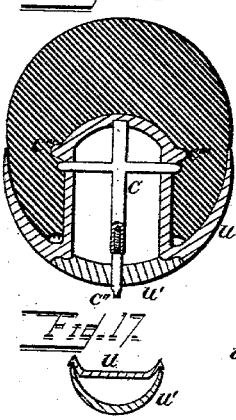
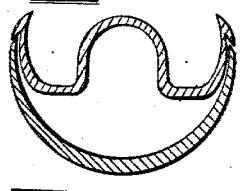
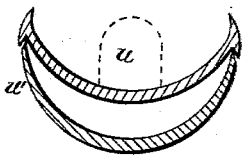
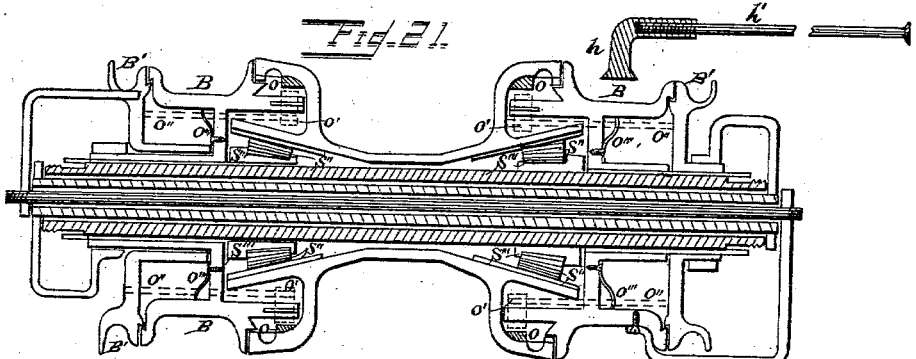
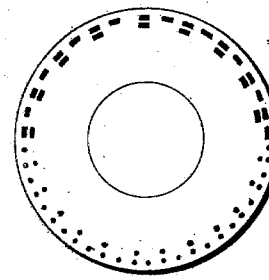
WITNESSES
F. L. Ourand
A. J. King
INVENTOR
Homer A. King

UNITED STATES PATENT OFFICE.

HOMER A. KING, OF SPRINGFIELD, MASSACHUSETTS.

VELOCIPEDE.

SPECIFICATION forming part of Letters Patent No. 349,800, dated September 28, 1886.

Application filed May 10, 1886. Serial No. 201,725. (No model.)

*To all whom it may concern:*

Be it known that I, HOMER A. KING, a citizen of the United States, residing at Springfield, in the county of Hampden and State of Massachusetts, have invented new and useful Improvements in Velocipedes, which improvements are fully set forth in the following specification, the accompanying drawings making part of the specification.

My invention relates to improvements in motor-carriages, especially bicycles, tricycles, and quadricycles; and it consists in an improved construction of the frame of tricycles; in a new construction and suspension of a baby's seat; in improvements in adjusting the propelling-straps in connection with levers to increase the power or the speed; in an improved social tricycle, very narrow, yet adapted to be propelled by three or more riders, and a part removable, leaving a bicycle adapted to carry one or two persons; in a spring as the only connection between the frame and the fork of the steering-wheel; in a new construction of a hollow felly-rim; in improved means of securing the rubber tire to the felly and from slipping on the felly.

These improvements are described in connection with some of my improvements more fully described in my application filed September 4, 1884, Patent No. 327,397, also Patents Nos. 327,954 and 341,383.

Referring to the drawings, similar letters of reference indicate corresponding parts.

Figure 1 is a plan view of my tricycle when composed of the parts shown in Figs. 2 and 4, without the auxiliary backbone M'', being adapted to be propelled by one or two or three riders. Fig. 2 is a side elevation view of the right-hand half of Fig. 1, but may have another wheel like the one shown and a steering-wheel, and be adapted to carry one rider between the wheels, or with two seats, as a a tandem. The baby-seat S' is supported by the upright part of the frame J on a tube over the spiral springs, or on flat springs, as shown in Fig. 3. The handle L may be used to adjust the speed-gear, moving it toward the drum to increase the speed, or from it to increase the leverage power. The surface may be left smooth, or in notches, or in wave form, as shown in Fig. 3.

Fig. 3 is the speed-gearing of Fig. 2 enlarged, and the boxing secured to the lever by set-screw $n'$, and in Fig. 5 is cut away to show the pulley $n$, around which the propelling-strap D and the retracing-strap H' pass and are secured to the link $n''$. The position of the end of the straps, as shown at link $n''$, is for power, and the movements of the levers E scarcely revolve the pulleys $n$, thus causing no added friction or increase of speed; but when the link $n''$ is moved toward the propelling-drum, bringing the position of the straps as shown by broken line, or as in Fig. 4, nearly double the length of strap is taken up at every movement of the levers, thus rotating the drive-wheel about three-fourths or four-fifths of a revolution at every foot stroke of the lever E, giving, when set at great speed, a fifty-two or fifty inch wheel the speed of a sixty-five or seventy inch crank-wheel.

Fig. 4 is a side elevation view of the left-hand side of Fig. 1, with the auxiliary backbone M'' added, and can be used alone as a bicycle with or without the auxiliary backbones M''', which, when used, are adjusted up from the ground or the reverse by moving the handle S' back or forth, which is connected by a jointed rod inside the frame J to the stays at S. The upper saddle is attached to the fork I, and may be removed with it, and the auxiliary backbones M'', stays S, and levers E', and the bicycle be adapted to but one rider on the lower seat; or only the upper saddle may be used by adjusting the lower ends of the braces N'' over the small steering-wheel, lengthening the handle-bar $r'$ by the set-screw, as shown, bringing the handle $r$ up to the upper saddle, and securing the shaft $r'$ in a collar to the backbone J. The spring N' is the only connection between backbone J or the shaft $r'$ and the fork of the small steering-wheel, which prevents the jar of the handle-bar experienced where the shaft is connected directly with the fork of the steering-wheel.

Fig. 5$^a$ shows the construction of the frame and gearing enlarged; but Fig. 5$^b$, as Fig. 3, represents the construction which I prefer with the improved connection through the hub shown in Fig. 21, and no straps or levers above the propelling-drums. Fig. 6$^a$ is Fig. 4 with the small wheel in the rear of the large wheel as the steering-wheel. Fig. 6$^b$ shows the construction as Fig. 3, which I prefer with the connection through the hub as shown in Fig. 21, and no straps or lever projection above the propelling-drums. Figs. 7, 8, and 9 show the union of the fork $f'$ and the manner of connecting it with the backbone M′ by the neck and pivot held in place by the bolt $f'''$. Fig. 8 is a cross-section of Fig. 7 in the line $v\ v$, and Fig. 9 shows a cross-section lower down. Fig. 7 also shows a side elevation sectional view of my adjustable saddle-frame, taken in the line $z\ z$, Fig. 6. Fig. 10 shows a top view, and Fig. 11 shows a rear view. The saddle-frame $p$ is secured around the backbone by the nut, and the spiral spring $p'$ forces up the center $p''''$ when there is no weight on the saddle, drawing the arms $p'''$ through the openings $p''$, and thus drawing the sides of the frame $p''''$ nearer together, thus clearing the legs of the rider, which is very important when he is bearing all his weight on the pedals; but when he bears his weight in the saddle the leather presses down the center $p''''$, forcing down the spiral spring and pushing the rods $p'''$ down through the openings $p''$, and spreading the sides $p''''$ of the frame and sides of the saddle as soon as the weight of the rider is on the seat.

Fig. 13 is a side elevation view of Fig. 2 arranged as a tandem, the rear seat being connected to the frame in front of the axle and propelling-drums, thus preventing tipping down in the rear. It may be constructed of straight lines of detachable tubing, and yet have the rear seat-support connected from the front out under the axle, substantially as shown, by the curved lines of tubing. The front seat, though far in front of the main axle, is connected over the axle, around, under, and out in front to the steering-wheel.

Fig. 12 is a plan view of a tandem with both drive-wheels, as the left-hand side of Fig. 1, for from one to six riders.

Fig. 14 shows the construction of the rollers $d$ and $d'$, which are used to roll into shape the strip of metal $u$ for the one part of my double protuberant hollow felly-rim, made of two pieces of metal. With two rollers like $d'$ and one like $d$, the strip of metal can be rolled into the exact circle for any desired size of wheel. By a little side pressure after the rim is bent, or by a slight change of the rollers, the projections $c'''$, Fig. 19, may be made to project outward into the inner sides of my improved rubber tire, and thus secure it from slipping or coming out of its place.

Fig. 15 shows the rollers $e$ and $e'$ to roll out $u'$—one part of my hollow felly-rim—and two rollers like $e'$ and one like $e$, properly adjusted, will roll it into any desired size of wheel.

Fig. 19 is a cross-section of my completed hollow felly-rim constructed of two pieces of metal rolled into the desired shape and the ends of each brazed together, with the inner portion a trifle larger than the place it is to fill, when the outer portion is heated and dropped over the other, and, cooling, hugs it tightly, so that riveting or brazing is unnecessary, though either can be easily done at the place where the spokes go in, as both sides are accessible when the rubber tire is not in place. It is well to put the two parts of the rim together with the brazed portions at opposite sides of the wheel, to balance the weight and give greater strength where united.

Fig. 19 also shows my improved rubber tire.

Figs. 16, 17, and 18 show slight modifications in style and construction of my hollow felly-rim. The slight change in rollers for Fig. 17 is indicated by broken lines in Fig. 14. In Figs. 16 and 18 the parts should be united farther in than shown in the drawings, so that the outer portion need not be heated very hot to enlarge the circle enough to drop over the inner portion. The forms might be still further varied. I do not limit myself to exact constructions, but shall claim all that fairly comes within the scope of my invention.

Fig. 20 is a view from beneath the cross $c$ from the hub, as shown in place in Fig. 19. The cross will not be used when the projections $c'''$ are made on the sides of the central elevation of the hollow rim; but when the cross $c$ is used the projections $c'$ should be longer and project farther into the rubber by turning it with a wrench applied at $c''$. The springs $m$ are intended only to hold the cross in place with the points $c'$ even with the edge next to the rubber tire.

Fig. 21 shows my improved tubular hub with inclined surfaces in each end for my improved bearings, and with the hub-flange rising high enough to clear the silent ratchet mechanism, then projecting outward, with a flange to receive the ratchet-wheel $o$ and the spokes within the same projection. Some may prefer another flange, but I do not. Direct spokes may be used, or the tangent spoke-holder $h$ fitted into the end of the hub-flange, on which the ratchet $o$ is secured, and the spoke $h'$, with headed end in the felly-rim and the other end screwed into the end of the spoke-holder, and may be tightened as a direct spoke. I now use but two flexible connections to the levers on each side of the bicycle, one on the propelling-drum B and one on the retracing-drum B′, with drum B on each side of the bicycle connected through the hub with B′ on the other side, so that the depression of one lever on one side raises the lever on the other side of the vehicle. As the weight of rider and vehicle does not come on these inner shafts, they revolve without much, if any, friction, and the outer axle, which receives the nut or nuts to hold the frame together, may also revolve under pressure, as I prefer to have the frame fitted and rest on an outer short tube which passes into the collar S′′′, or to the washer or washers, by which it is adjusted laterally, and thus relieve the drums B or B′ of any lateral pressure as they revolve in opposite directions, except the pressure of the ratchet-connection $o''$ against the drum B′ by the spring $o'''$, which moves the dog $o'$, causing it to bite into the ratchet $o$ to propel the drive-wheel, and to silently withdraw as drum B is brought back to its position again, or when it remains stationary in coasting or running the vehicle backward. The inclined rollers $S''$ roll between the inclined opening in the end of the hub and the inclined collar $S'''$, and are held in place by the shoulders on the collar.

Fig. 22 shows an end view and a cross-section view of my tube-flange to form the hubs for my tricycle, one spoke passing through two openings and the next through but one, in order to come out on the same side and meet with as little air-resistance as possible. One piece of wire may be put through the flange and form two tangent spokes; or direct spokes may be used and screw into the tube, as the support of the flange would prevent the spokes breaking where screwed into the tube or shoulder of the flange. These flanges can be used on my bicycle-hub, if desired.

A part of these improvements was described in the original application filed January 20, 1886, Serial No. 189,181, which has been divided into three separate applications. The rubber tire claimed in the other application of same date as this I hereby disclaim in this application.

Having thus described my invention, what I claim as new, and desire to secure by Letters Patent, is—

1. A vehicle constructed with a seat for one rider in line with one of two wheels, A, of equal diameter, and also with a seat for a rider between two wheels of equal diameter, and with pedal-levers for said seats, enabling either rider or both riders to propel the vehicle, substantially as set forth.

2. A vehicle constructed with a seat for one rider between two wheels, A, of equal diameter, and with seats for more than one rider in line with one of two wheels of equal diameter, and with pedal-levers for said seats, so that either one of the riders occupying said seats may propel the vehicle or more than one assist in propelling it, substantially as set forth.

3. A vehicle constructed with seats for more than one rider between two wheels, A, of equal diameter, and with a seat for one rider in line with one of the two wheels of equal diameter, and with pedal-levers for said seats, enabling one rider to propel the vehicle or more than one assist in its propulsion, substantially as set forth.

4. A vehicle constructed with seats for more than one rider between two wheels, A, of equal diameter, and with seats for more than one rider in line with one of two wheels of equal diameter, and with pedal-levers for said seats, enabling one rider to propel the vehicle or more than one assist in its propulsion, substantially as set forth.

5. A vehicle constructed with a front steering-wheel, and with two driving-wheels, A, of equal diameter, and with seats to carry more than one rider in line with each driving-wheel, and with pedal-levers to said seats, enabling one of the riders to propel the vehicle or more than one rider assist in propelling it, substantially as set forth.

6. A vehicle constructed with two driving-wheels of equal diameter, and with a seat for one rider in line with each driving-wheel, and with pedal-levers each side of each driving-wheel A, enabling one rider to propel the vehicle or more than one to assist in propelling it, substantially as set forth.

7. A vehicle with two driving-wheels, A, of equal diameter, and with a seat in line with one of the driving-wheels, and with pedal-levers, enabling one person to propel the vehicle, substantially as set forth.

8. A vehicle with two driving-wheels, A, of equal diameter, united essentially as set forth, so that one driving-wheel with its driving mechanism may be removed and the part remaining be a complete bicycle, with a seat to carry one rider in line with its driving-wheel.

9. A vehicle-frame constructed of one piece of tubing, extending from the steering-wheel back underneath the axle and curving over upon the spring-adjusted tube $J'$, thence forward, forming a seat-support, thence curving downward, and again upward to support the handle-bar, substantially as set forth.

10. The felly $u$, constructed of one piece of metal, with outer protuberant projection in the rubber bed and central open formation toward the hub, which may be closed nearest the hub, forming a hollow felly-rim.

11. A felly-rim constructed of two pieces of metal, with an inner protuberant surface toward the hub and a protuberant elevation between the side flanges of the rubber tire-bed.

12. A fastener for securing rubber tire to felly-rims, having an elevation between the flanges of the rubber bed, the fastener being secured in the hollow felly-rim and having projections to hold the rubber tire in place, substantially as set forth.

13. The projection $c'''$ on the sides of the central elevation of a hollow felly-rim, projecting outward into the rubber tire to hold it in place.

14. A bicycle with a tubular hub, with a tubular axle, and with more than one shaft through the tubular axle, connected with propelling-drums and retracing-drums and with levers, so that the depression of a lever on one side of a driving-wheel raises the lever on the other side of the driving-wheel without the use of a cog-wheel.

15. The saddle-frame $p$, $p''$, and $p''''$, with automatic side and upward adjustment, substantially as and for the purpose set forth.

16. The frame J, with fork F secured to the axle on each side of the drive-wheel, for the fulcra-support of the levers.

HOMER A. KING.

Witnesses:
A. J. KING,
E. P. BARTHOLOMEW.